United States Patent [19]

Wardley

[11] Patent Number: 4,699,227
[45] Date of Patent: Oct. 13, 1987

[54] METHOD OF FORMING CUTTING STRUCTURES FOR ROTARY DRILL BITS

[75] Inventor: Michael T. Wardley, Stroud, England

[73] Assignee: NL Petroleum Products Limited, Gloucestershire, England

[21] Appl. No.: 808,328

[22] Filed: Dec. 12, 1985

[30] Foreign Application Priority Data

Dec. 14, 1984 [GB] United Kingdom ............... 8431633

[51] Int. Cl.$^4$ ..................... E21B 10/52; B21K 5/02
[52] U.S. Cl. ................................. 175/329; 175/375; 175/410; 76/108 A
[58] Field of Search ............... 175/329, 374, 375, 409, 175/410, 411; 228/119, 120, 122, 263.11, 263.16; 76/108 A, 108 R, DIG. 12

[56] References Cited

U.S. PATENT DOCUMENTS

| | | | |
|---|---|---|---|
| 4,117,968 | 10/1978 | Naidich et al. | 228/124 |
| 4,156,123 | 5/1979 | Fischer et al. | 175/375 |
| 4,338,380 | 7/1982 | Erickson et al. | 228/120 |
| 4,352,400 | 10/1982 | Grappendorf et al. | 175/410 |
| 4,373,410 | 2/1983 | Davis | 175/329 |
| 4,608,226 | 8/1986 | Lauvinerie | 175/329 |

FOREIGN PATENT DOCUMENTS

| | | | |
|---|---|---|---|
| 2084219 | 4/1982 | United Kingdom | 175/329 |
| 2151283 | 7/1985 | United Kingdom | 175/329 |

Primary Examiner—Stephen J. Novosad
Assistant Examiner—Terry Lee Melius
Attorney, Agent, or Firm—Browning, Bushman, Zamecki & Anderson

[57] ABSTRACT

A method of forming a cutting structure for a rotary drill bit comprises brazing a thermally stable polycrystalline diamond cutting element to a carrier, the carrier being formed of a material such that, at the brazing temperature, the difference in coefficient of thermal expansion between said material and the polycrystalline diamond material is less than the difference in coefficient of thermal expansion between tungsten carbide and the polycrystalline diamond material. A suitable carrier material is silicon carbide.

12 Claims, 8 Drawing Figures

METHOD OF FORMING CUTTING STRUCTURES FOR ROTARY DRILL BITS

BACKGROUND OF THE INVENTION

The invention relates to cutting structure for rotary drill bits for use in drilling or coring deep holes in subsurface formations.

In particular, the invention is applicable to cutting structures for rotary drill bits of the kind comprising a bit body having a shank for connection to the drill string and an inner channel for supplying drilling fluid to the face of the bit, the bit body carrying a plurality of cutting structures. Each cutting structure comprises a cutting element, often in the form of a circular disc, having a hard cutting face formed of polycrystalline diamond or other superhard material and mounted on a carrier which is, in turn, mounted on the bit body.

Conventionally, each cutting element has usually been a preform comprising two layers: a hard facing layer formed of polycrystalline diamond or other superhard material, and a backing layer formed of less hard material, usually cemented tungsten carbide, the two layers being bonded together during formation of the cutting element in a high pressure forming press.

In one common form of drill bit of the abovementioned type, the bit body is machined from steel and each cutting structure includes a stud or post to which the polycrystalline diamond preform is brazed, the stud or post being received and secured, for example by shrink fitting, in a socket in the steel bodied bit. The post or stud is formed from a hard and erosion resistant material such as cemented tungsten carbide.

Conventional two-layer preforms of the kind referred to above are only thermally stable up to a temperature of about 700° to 750° C. Due to this limitation, problems have arisen in brazing the preforms sufficiently securely to the stud or post. Generally speaking, the strength of a brazed joint depends on the liquidus temperature of the braze alloy—the higher the liquidus temparature the greater the strength. Accordingly, if the brazing is carried out at a temperature which the preform can withstand the resultant brazed joint may not be sufficiently strong to resist the substantial mechanical forces to which it is subjected during drilling. The joint may also fail as a result of high temperatures reached during drilling.

If a higher temperature brazing process is employed, however, sophisticated cooling techniques must be employed to protect the two-layer preform from the high temperature at which brazing takes place. Such techniques are described, for example, in U.S. Pat. No. 4,319,707.

There are, however, now available polycrystalline diamond materials which are thermally stable at higher temperatures, for example temperatures over about 1100° C. Such a thermally stable diamond material is supplied by the General Electric Company under the trademark 'GEOSET'.

This material has most commonly been applied to rotary drill bits by setting pieces of the material in the surface of the bit body so as to project partly from the surface, using similar methods to that previously used to mount natural diamonds in a bit body. However, since such thermally stable elements do not have a backing layer to provide support, they have normally been of substantially greater thickness, in the cutting direction, than the diamond layer of conventional two-layer preforms in order to provide the necessary strength.

Thermally stable polycrystalline diamond cutting elements are available which are of similar shape to the conventional two-layer preforms, for example in the form of thin circular discs, and various methods have been devised for mounting such cutting elements on a bit body. The use of elements of such shapes is advantageous since they provide a degree of self-sharpening. This is due to the fact that the material on which the cutting element is mounted will be less hard than the polycrystalline diamond material of the cutting element, and thus wears away more rapidly in use.

The use of thermally stable cutting elements has the advantage, over conventional two-layer preforms, that higher brazing temperatures may be used to obtain the required strength for the brazed joint, without the need for sophisticated cooling techniques and yet without the risk of the preform being damaged by overheating. The use of such thermally stable preforms also has the advantage that they are less liable to damage through overheating during use on a drill bit. The preforms may also be cheaper to manufacture than two-layer preforms, one possible reason for this being that since they are not initially formed with a backing layer they may be thinner than two-layer preforms so that more of them may be formed in the press at the same time.

The use of thermally stable cutting elements may also be advantageous in the case where the bit body is formed by a powder metallurgy process. In such process a mould is packed with powdered material, such as tungsten carbide, which is then infiltrated with a metal alloy binder, such a copper alloy, in a furnace so as to form a hard matrix. The maximum furnace temperature required to form the matrix may be of the order of 1050° to 1170° C. As previously mentioned, conventional two-layer preforms are only thermally stable to a temperature of about 700° to 750° C. and for this reason it has been necessary to mount the cutting elements on the bit body after it has been formed in the furnace. However, if thermally stable preforms are used the preforms may be located in the mould so that they become embedded in the surface of the bit body at the same time as the infiltrated matrix is formed in the furnace. Again, however, in order to obtain a a degree of self-sharpening it is desirable to be able to use thermally stable polycrystalline diamond cutting elements which are of similar shapes to the conventional two-layer preforms, for example in the form of thin discs.

Thus, in order to facilitate the mounting of a thermally stable cutting element on a bit body, whether it be of steel or of infiltrated matrix, it would be advantageous to incorporate the cutting element in a cutting structure including a carrier to which the thermally stable cutting element is brazed. Hitherto, it has been considered that such carrier should be formed of tungsten carbide, which, as previously mentioned, is the material normally used for the carrier in the case of conventional two-layer, non-thermally stable preforms. However, problems arise in brazing thermally stable cutting elements to carriers tungsten carbide. In particular, the substantial difference in coefficient of thermal expansion between the polycrystalline diamond material and tungsten carbide, at the brazing temperature, results in substantial stresses arising when the cutting structure is cooled after brazing, resulting in failure of the cutting element and/or carrier or, at the very least weakening of the bond. This disadvantage offsets the advantage of being able to use a higher brazing temperature. The present invention sets out to provide a method of manufacturing a cutting structure, using a thermally stable polycrystalline diamond cutting element, in which at least certain of the problems encountered hitherto may be overcome.

SUMMARY OF THE INVENTION

Accordingly, the invention provides a method of forming a cutting structure of a rotary drill bit comprising brazing a thermally stable polycrystalline diamond cutting element to a carrier, the carrier being formed of a material such that, at the brazing temperature, the difference in coefficient of thermal expansion between said material and the polycrystalline diamond material is less than the difference in coefficient of thermal expansion between tungsten carbide and the polycrystalline diamond material.

As is well known, the coefficient of thermal expansion of a material varies with temperature. Although, for the purpose of convenient comparison, it is conventional to refer to the coefficient of thermal expansion 'at the brazing temperature', it is to be understood that such coefficient, when quoted in this fashion, in fact represents an average figure for the coefficient of thermal expansion over the range of temperature from ambient temperature up to the brazing temperature.

Thus, by selecting for the carrier a material, other than tungsten carbide, of suitable coefficient of thermal expansion, the stresses induced in the carrier and cutting element during brazing of the cutting element to the carrier may be reduced, thus reducing in turn the risk of failure of either element, or of the braze.

In order to achieve a significant improvement, the difference in coefficient of thermal expansion between said carrier material and the polycrystalline diamond material is preferably less than $3 \times 10^{-6}/°$ C.

A suitable material for the carrier is silicon carbide. For example, the coefficient of thermal expansion of polycrystalline diamond, at a typical brazing temperature, is of the order of $3 \times 10^{-6}/°$ C., whereas the coefficient for tungsten carbide is of the order of $6 \times 10^{-6}/°$ C. On the other hand, the coefficient of thermal expansion of silicon carbide is likely to be in the range of $3 \times 10^{-6}/°$ C. to $4.5 \times 10^{-6}/°$ C., depending on the temperature range of brazing.

In addition to overcoming problems associated with differential thermal expansion and contraction of the carrier and cutting element, the use of silicon carbide as a carrier material may also have the advantage of facilitating the brazing of the cutting element to the carrier. Some types of thermally stable polycrystalline diamond cutting element are formed using a silicon and/or silicon carbide catalyst, with the result that the finished cutting element incorporates silicon carbide particles between the diamond crystals. This facilitates the brazing of the cutting element to the carrier when the carrier is also formed of silicon carbide.

Other methods of facilitating the brazing of the thermally stable cutting element to the carrier may include the preliminary step, prior to brazing, of coating the thermally stable cutting element with a suitable material.

It is to be understood that, in the case where a material other than silicon carbide is used for the carrier, such material, in addition to having the desired coefficient of thermal expansion as referred to above, must also have the other characteristics necessary in a carrier for a cutting element. Thus, it must be capable of being brazed to the cutting element and of withstanding the brazing temperature. It is also desirable that the finished cutting structure as a whole, comprising the cutting element and carrier, should also be thermally stable so that the structure may be incorporated in a matrix bit body during formation of the bit body in the furnace. To achieve this the brazing temperature must be higher than that of the infiltration temperature in the matrix-forming furnace, and the material of the carrier must in that case also be able to withstand the necessary brazing temperature. Furthermore, the modulus of elasticity of the carrier material should also be sufficient to provide adequate support for the cutting element and should, preferably, be comparable to the modulus of elasticity of tungsten carbide.

The coefficient of thermal expansion of the carrier material, as well as being less than that of tungsten carbide, is also preferably not less than that of polycrystalline diamond, although the invention does include within its scope the use of materials having a coefficient of thermal expansion less than that of polycrystalline diamond, provided that the difference in coefficient is as previously specified according to the invention.

The invention also includes within its scope a cutting structure when formed by the method according to the invention, and a rotary drill bit incorporating a plurality of such cutting structures.

The shape and configuration of the thermally stable cutting element and the carrier may be of any form according to the requirements of the drill bit design.

BRIEF DESCRIPTION OF THE DRAWINGS

FIGS. 1a and 1b to 4a to 4b of the accompanying drawings illustrate typical forms of cutting structure which may be manufactured by the method according to the invention.

DETAILED DESCRIPTION OF THE PREFERRED EMBODIMENTS

Figure 1A:
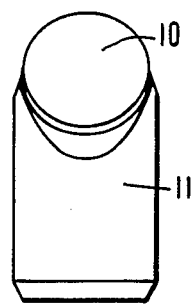
Figure 1B:
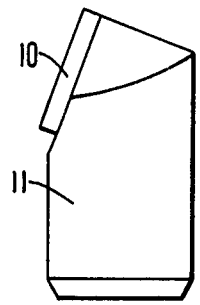
Figure 2A:
Figure 2B:
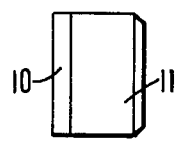
Figure 3A:
Figure 3B:
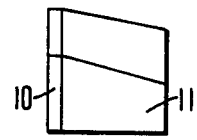
Figure 4A:
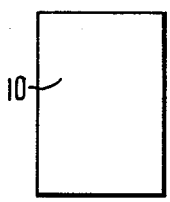
Figure 4B:
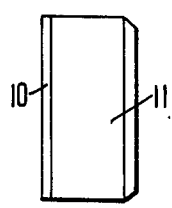

In each case shown in the drawings the thermally stable cutting element is indicated at 10 and the carrier at 11.

Typical brazing alloys which might be used for brazing the thermally stable cutting element to the carrier are those manufactured by GTE Wesgo under the trade marks 'CUSIL-ABA', 'INCUSIL-10 ABA', 'INCUSIL-15 ABA' and 'CRONIRO'.

The techniques for using these brazing materials are commercially available from the manufacturers and will not therefore be described in detail.

Other alloys which may be used to braze the thermally stable cutting elements to silicon carbide carriers are copper/phosphorus alloys and germanium/silicon alloys with titanium. Brazing with the latter alloy is usually done in a vacuum at a temperature of 1200° to 1300° C.

As previously mentioned, the brazing of the thermally stable cutting elements to the carrier may be facilitated by prior coating of the surface of the cutting element. Suitable alloys for coating are copper based alloys which contain an element with a strong carbide-forming property, such as chromium, vanadium, titanium and boron. Such alloys are commercially available.

A good brazable coating may also be applied to the cutting element by vapour deposition of a good carbide-forming element, the cutting element, after the vapour deposition, being heated until the element reacts with the diamond. Suitable elements may be chromium, titanium, zirconium and silicon.

Ready coated thermally stable polycrystalline diamond preforms are also commercially available. For example, there is supplied by DeBeers a coated version of the preform known as Syndax 3 which is a silicon filled thermally stable diamond preform.

I claim:

1. A method of forming a cutting structure for a rotary drill bit comprising brazing a pre-formed thermally stable polycrystalline diamond cutting element to a separately pre-formed carrier, the carrier being formed of a material such that, at the brazing temperature, the difference in coefficient of thermal expansion between said material and the polycrystalline diamond material is less than the difference in coefficient of thermal expansion between tungsten carbide and the polycrystalline diamond material.

2. A method according to claim 1, wherein the difference in coefficient of thermal expansion between said carrier material and the polycrystalline diamond material is less than $3 \times 10^{-6}/°$ C.

3. A method according to claim 2, wherein the carrier material is silicon carbide.

4. A method according to claim 3, wherein the brazing material used to braze the cutting element to the carrier is a copper/phosphorus alloy.

5. A method according to claim 3, wherein the brazing material used to braze the cutting element to the carrier is a germanium/silicon alloy.

6. A method according to claim 5, wherein the germanium/silicon alloy includes titanium.

7. A method according to claim 1, including the preliminary step, prior to brazing the cutting element to the carrier, of coating the cutting element with a material to facilitate the brazing.

8. A method according to claim 7, wherein the material with which the cutting element is coated is a copper-based alloy including an element selected from chromium, vanadium, titanium or boron.

9. A method according to claim 7, including the steps of applying the coating material to the surface of the cutting element by vapour deposition, and then heating the cutting element until the coating material reacts with the polycrystalline diamond material of the cutting element.

10. A method according to claim 9, wherein the coating material is selected from chromium, titanium, zirconium and silicon.

11. A method according to claim 1, wherein the cutting element comprises a flat circular disc of thermally stable polycrystalline diamond material.

12. A method according to claim 1, wherein the carrier comprises a substantially cylindrical stud having a flat surface inclined at an angle to the longitudinal axis of the stud, to which surface the cutting element is brazed.

* * * * *